United States Patent [19]

Casavant et al.

[11] Patent Number: 5,442,797

[45] Date of Patent: Aug. 15, 1995

[54] LATENCY TOLERANT RISC-BASED MULTIPLE PROCESSOR WITH EVENT DRIVEN LOCALITY MANAGERS RESULTING FROM VARIABLE TAGGING

[76] Inventors: Thomas L. Casavant, 423 Grand St.; Samuel A. Fineberg, 2804 Lakeside Manor, both of Iowa City, Iowa 52240

[21] Appl. No.: 800,530

[22] Filed: Dec. 4, 1991

[51] Int. Cl.⁶ .............................................. G06F 13/00
[52] U.S. Cl. ........................... 395/800; 364/DIG. 1;
364/229; 364/232.23; 364/260; 364/260.2;
364/280; 364/281.3; 364/281.7; 364/284;
395/650
[58] Field of Search ................ 395/650, 800; 364/229,
364/232.23, 260, 260.2, 280, 281.3, 281.7, 284

[56] References Cited

U.S. PATENT DOCUMENTS

| | | |
|---|---|---|
| 4,079,327 | 3/1978 | Van Uffelen . |
| 4,598,400 | 7/1986 | Hillis . |
| 4,773,038 | 9/1988 | Hillis et al. . |
| 4,791,641 | 12/1988 | Hillis . |
| 4,805,091 | 2/1989 | Thiel et al. . |
| 4,814,973 | 3/1989 | Hillis . |
| 4,827,403 | 5/1989 | Steele, Jr. et al. . |
| 4,830,376 | 5/1989 | Hillis . |
| 4,969,088 | 11/1990 | McAuliffe et al. . |
| 4,984,235 | 1/1991 | Hillis et al. . |
| 4,984,237 | 1/1991 | Franaszek . |
| 5,008,815 | 4/1991 | Hillis . |
| 5,047,917 | 9/1991 | Athas et al. .................. 364/200 |
| 5,050,069 | 9/1991 | Hillis et al. . |
| 5,083,265 | 1/1992 | Valrant .......................... 395/800 |
| 5,113,514 | 5/1992 | Albonesi et al. ............... 395/425 |
| 5,175,733 | 12/1992 | Nugent ........................ 370/94.3 |
| 5,201,040 | 4/1993 | Wada et al. ................... 395/400 |

FOREIGN PATENT DOCUMENTS

WO88/01772 3/1988 WIPO .
WO89/07299 8/1989 WIPO .

OTHER PUBLICATIONS

W. Daniel Hillis et al., "Data Parallel Algorithms," *Communications of the ACM*, Dec. 1986, vol. 29, No. 12, pp. 1170–1183 (and Update).
W. Daniel Hillis, "The Connection Machine," pp. 108–115.
W. Daniel Hillis, "Richard Feynman and the Connection Machine," *Physics Today*, Feb. 1989, pp. 78–83.
W. Daniel Hillis et al., "Research Note Exploiting Symmetry in High–Dimensional Finite Difference Calculations," *Journal of Parallel and Distributed Computing*, vol. 8, pp. 77–79.
W. Daniel Hillis et al., "Programming A Highly Parallel Computer," *Nature*, vol. 326, Mar. 5, 1987, pp. 27–30.
W. Daniel Hillis, "Co-Evolving Parasites Improve Simulated Evolution As An Optimization Procedure," *Physica D*, vol. 42, 1990 pp. 228–234, North-Holland.

*Primary Examiner*—K. Kriess
*Assistant Examiner*—Jonathan Hall Backenstese

[57] ABSTRACT

A method and an apparatus for reconciling communication and locality by enabling a user/programmer to write programs in an extended procedural language which explicitly manipulate locality. The multiprocessor includes a plurality of processing elements connected to each other each processing element having a unique address and including a central processing unit for executing local CPU code and reading and writing local data and a locality manager for controlling data movement between processing elements which are co-operating on a single task by executing local locality manager code which indicates when shared data can be released and when non-local data is requested.

21 Claims, 11 Drawing Sheets

LATENCY TOLERANT RISC-BASED MULTIPLE PROCESSOR WITH EVENT DRIVEN LOCALITY MANAGERS RESULTING FROM VARIABLE TAGGING

BACKGROUND OF THE INVENTION

1. Field of the Invention

This invention relates generally to a method and an apparatus for reconciling communication and locality in parallel processor systems and particularly to a method and apparatus for enabling a user/programmer to write programs in an extended procedural language such as an extended C programming language which explicitly manipulate locality in order to optimize performance of a parallel multiprocessor.

2. Background of the Related Art

A recurrent problem posed by parallel processing architectures is that of communication latency. Communication latency is the time required for a communication operation to complete. This time may include transfer time, overhead, and the time spent waiting for data synchronization. Communication latency exists in any parallel architecture regardless of whether it supports a shared or a non-shared memory paradigm. Latency in and of itself however, does not have to result in diminished performance. Rather, performance is diminished whenever a central processing unit (CPU) within a parallel system is forced to wait for some communication (or synchronization) operation. Therefore, latency may be addressed by either decreasing time cost of communication or by overlapping it with other tasks, i.e., tolerating latency.

One common method of decreasing the time cost of communication on shared memory systems is through cache memory. With cache memory, hardware is utilized to bring more frequently accessed data into memories that are closer to each CPU. This process is done automatically and utilizes a principle of locality. By bringing these data into local cache memory, the time cost of most loads and stores is reduced, thereby reducing latency. However, programs do not always exhibit such locality, particularly parallel programs accessing shared data. Further, this locality is hidden from a programmer and therefore is difficult to exploit.

Another technique, more common to distributed memory systems, is to increase communication bandwidth. This decreases communication latency by reducing the time required to send and receive data. Unfortunately, on many existing systems, the amount of time associated with software overhead tends to dominate communication time. While this may be improved by using a hardware coprocessor as in J. -M. Hsu and P. Banerjee, "A message passing coprocessor for distributed memory multicomputers," *Supercomputing '90*, November 1990, pp. 720-729, this solution is not complete because overheads still exist in controlling a coprocessor. Also, this solution does not aid a programmer in finding and exploiting locality. Finally, if data is not ready to be sent, no reduction of communication cost can eliminate associated data synchronization latency.

An alternative to reducing latency is to simply tolerate it. There are several mechanisms that have been utilized to tolerate latency. These have one common aspect. They change the programming paradigm from a control based model to a data based one. This is because data movement and synchronization are fundamental to the problem of communication latency (Arvind and R. A. Iannuci, *Two Fundamental Issues in Multiprocessing*, Tech. Report MIT/LCS/TM-330, MIT Laboratory for Computer Science, 1987).

One approach to latency tolerance is that used in dataflow machines such as Monsoon (FG.M. Papadopoulos and D. E. Culler, "Monsoon: an explicit token-store architecture," *17th Annual Symposium on Computer Architecture*, May 1990, pp. 82-91). In such data flow machines, computation follows data movement. When all data for a given computation become ready, a computation takes place. Thus, latency is only reflected in program execution time when there is no data ready to be computed upon. Further, dataflow machines are most efficient when used with a "dataflow language" such as Id or Sisal.

Another approach to latency tolerance is that used in multithreaded machines such as HEP (B. J. Smith, "Architecture and applications of the HEP multiprocessor system," SPIE Vol. 298 Real-Time Signal Processing IV, 1981, pp. 241-248), Horizon (J. T. Kuehn and B. J. Smith, "The Horizon supercomputing system; architecture and software," *Supercomputing' 88*, November 1988, pp. 28-34), and Tera (R. Alverson, D. Callahan, D. Cummings, B. Koblenz, A. Porterfield, and B. Smith "The Tera computer system," 1990 International Conference on Supercomputing, June 1990, pp. 1-6). In these machines, latency is tolerated by keeping a large set of active light-weight processes (threads). Then, when a thread needs to access an operand from shared memory, the thread is put in a wait queue and another thread is activated. Similarly, threads are placed in a queue when they need to wait for some form of data synchronization. Then threads re-enter a pool of active threads as data becomes available. This mechanism is aided by a large set of hardware contexts and a large register file and thus it adds little overhead. Therefore, if enough threads exist and there is ready data, this mechanism allows latency to be hidden to some extent. However, this does not help in the execution time of a single thread. Thus, programs must be broken into many threads to take advantage of this mechanism. Further, the number of threads must grow at a rate that is higher than the growth in the number of processors to maintain latency tolerance.

While both of the above approaches (dataflow machines and multithreaded machines) are capable of tolerating latency, they both require a very high degree of parallelism-one that is much larger than the total machine size. Further, neither of these approaches can utilize off-the-shelf CPUs. Thus, they cannot, for example, take advantage of cost and performance benefits of new generation microprocessors, such as reduced instruction set computer (RISCs). For example, Intel i860 and Inmos T9000 are moderately priced and have peak performance levels in ranges once achieved only by supercomputers (25-100MFlops). RISCs utilize pipelining to exploit fine-grained parallelism and contain internal caches and floating point support.

While RISCs provide a significant improvement in cost/performance ratio, they accentuate problems associated with communication latency. For example, RISCs have significant memory bottlenecks, because memory speed has not kept up with the higher clock rates in CPUs. Even data accesses to locations within a Processing Element's (PE's) local memory may be costly, because any off-chip accesses add latency due to time required to drive external pins.

SUMMARY OF THE INVENTION

Therefore, an object of the invention is to provide a parallel multiprocessor architecture and software environment which enables a user to write programs so as to explicitly manipulate locality in order to tolerate latency and thereby optimize processing performance.

Another object of the invention is to provide a parallel multiprocessor and software environment which compiles and executes an extended procedural language such as extended C programming language.

Another object of the invention is to provide a reduced instruction code RISC-based parallel multiprocessor which can be programmed by a user for optimal performance.

A feature of the invention is that it uses a locality manager and a central processing unit in each processing element.

Another feature of the invention is that it has a runtime environment which has kernels for both the CPU and the locality manager.

Another feature of the invention is that it uses RISC microprocessor technology.

Another feature of the invention is that it allows a user to declare certain variables to be of a storage class taggable.

Another feature of the invention is that it provides for a "request" operation and a "release" operation which makes it possible to transfer data among a plurality of localities.

Another feature of the invention is that it allows a user to specify a count field that indicates how many localities must request a data item before the data item may be overwritten.

Another feature of the invention is that it allows a user to specify locality manager code (lmc) statements which are to be executed only by the locality manager.

An advantage of the invention is that it allows a programmer to explicitly manipulate locality in order to optimize performance.

Another advantage of the invention is that it can be implemented by extending any procedural language such as the C programming language.

Another advantage the invention is that it uses off the shelf RISC processors.

Another advantage the invention is that it enables a programmer to move data throughout the parallel multiprocessor.

The above and other objects, advantages and features are accomplished in accordance with the invention by the provision of a parallel multiprocessor including: a plurality of processing elements connected to each other, each processing element having a unique address and comprising: a central processing unit for executing local CPU code and reading and writing local data; and a locality manager for controlling data movement between processing elements which are cooperating on a single task by executing local locality manager code which indicates when shared data can be released and when non-local data is requested.

In accordance with one embodiment of the invention, program flow is controlled by declaring a variable to be a taggable variable; tagging the taggable variable yielding a tagged variable to indicate that data associated with the tagged variable may be moved to or from one or more of the plurality of processing elements; requesting data associated with the tagged variable from the plurality of processing elements whenever the data is required; and releasing data after a predetermined number of the above requesting steps to indicate that the data may be sent to non-local tagged variables.

The above and other objects, advantages and features are further accomplished in accordance with the invention by providing a method for making a parallel multiprocessor including the steps of: arranging a first processor to serve as a central processing unit for executing local CPU code; first coupling a second processor to the first processor to serve as a locality manager unit; second coupling a routing logic unit to the second processor, whereby the first processor, the second processor and the routing logic unit comprise a processing element; repeating the arranging, first coupling and second coupling steps yielding a plurality of processing elements; and interconnecting the plurality of processing elements by interconnecting the plurality of routing logic units.

The above and other objects, effects, features and advantages of the present invention will become more apparent from the following description of embodiments thereof taken in conjunction with the accompanying drawings.

DETAILED DESCRIPTION OF THE PREFERRED EMBODIMENTS

Any high performance design based on RISCs must try to exploit on-chip memory. Further, direct communication with I/O devices or coprocessors must be avoided due to latency associated with any communication over a processor bus. Finally, there must be some mechanism to tolerate long latencies associated with message passing or shared memory, or efficiency will fall off sharply.

The latency problem in RISC based multiprocessors is achieved by implementing a model for interprocessor communication in multiprocessors based on locality, a general mechanism for data movement, hardware required to implement a latency tolerant system and finally, extensions to a C programming language environment.

1. A locality based programming model

Figure 1A:
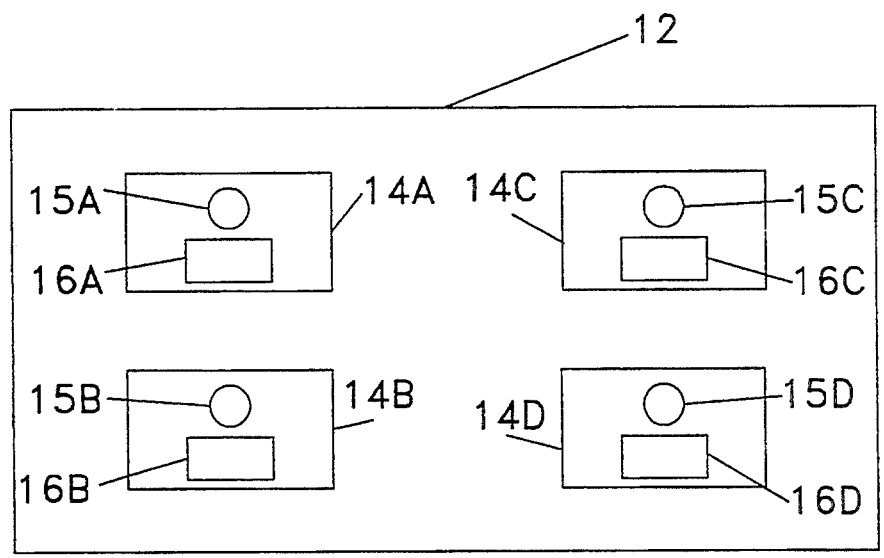
FIGS. 1A and 1B are schematic representations of initial steps taken in developing a multiprocessor according to an embodiment of the invention.
Figure 1B:
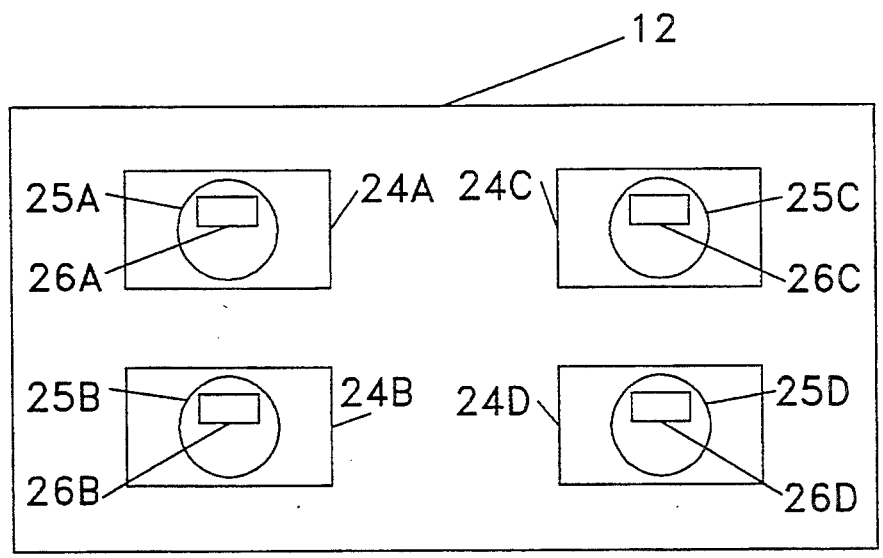

FIG. 1A shows multiprocessor 12 with 4 processing elements (PEs) 14A, 14B, 14C and 14D having central processing units (CPUs) CPUs 15A, 15B, 15C, 15D, respectively, where CPUs 15A, 15B, 15C and 15D can be RISCs. Such a machine, while potentially very fast, would be highly susceptible to latency. As a first step towards reducing latency, memory is distributed such that each of PE 14A, 14B, 14C and 14D, with each CPU 15A, 15B, 15C and 15D, has a memory module 16A, 16B, 16C and 16D. Memory references in multiprocessor 12 can be divided into two classes, local and non-local. For example, memory module 16A is local to processing element 14A but memory modules 16B, 16C, and 16D are non-local to processing element 16A. Providing local memory for each processing element has two effects. First, it reduces latency associated with memory operations local to that particular CPU. Second, it increases latency for non-local memory operations. Thus, if memory modules 26A, 26B, 26C and 26D, comprise cache hardware already present in respective CPUs 25A, 25B, 25C and 25D as shown in FIG. 1B, they can be utilized to reduce local access latency.

Multiprocessor 12 can be logically divided into localities, each having respective CPUs 25A, 25B, 25C and 25D and associated data and code. Within each locality a single process operates independently of other localities. CPUs 25A-D can utilize pipelining to take advantage of fine-grained parallelism. Therefore, a program need not have a level of parallelism larger than the number of PEs 14A-D. A parallel program can now be viewed as a set of localities. Interprocessor communication can be viewed as movement of data between localities. This is distinguished from message passing which is generally thought of as I/O in that data being moved is still typed and data movement must be from a variable on one processor to a similarly typed variable on another. Therefore, data is not moved as an I/O function on untyped bytes as with message passing. Rather, data is moved by placing a value of a variable local to one processor in a similar variable on another. Within a given locality, the CPU can execute efficiently as long as it does not need to wait for data from another locality. Therefore, data movement must follow program execution and, if possible, data movement must precede its necessity within a locality. Using additional hardware, this data movement can occur independently of a PE's CPU. Thus, if the data movement often precedes its need, most latency will not be reflected in total program execution time (i.e., it will be tolerated).

Figure 2:
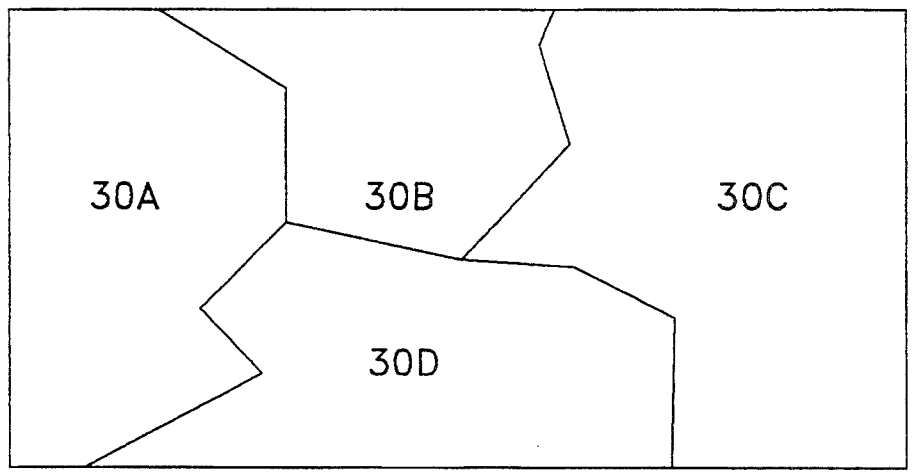
FIG. 2 is an abstract representation of an initial distribution of a global data set among different localities.
Figure 3:
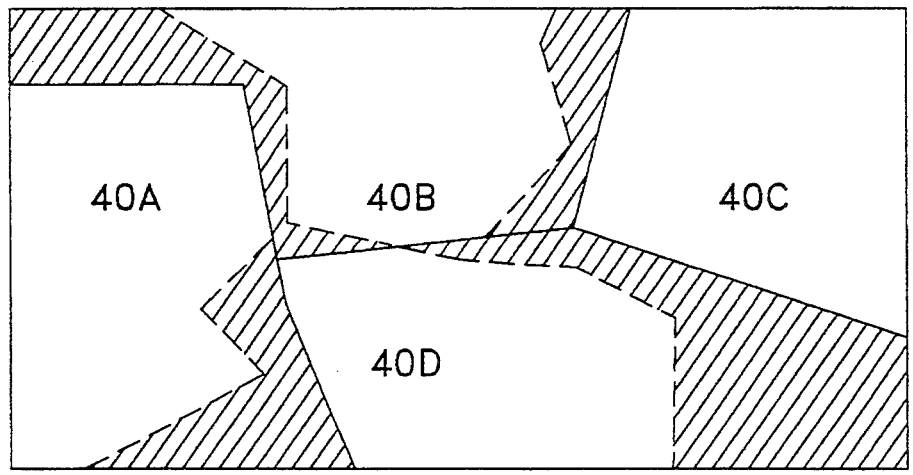
FIG. 3 is an abstract representation of a distribution of the global data set of FIG. 2 after some data movement.

As an example, FIG. 2 abstractly shows an initial distribution of data between localities 30A, B, C & D for some parallel program. As the computation proceeds, different localities will need different portions of a global data set. Therefore, as is shown in FIG. 3, at some later point in the program's execution, a distribution of local data may shift significantly into a distribution of data into localities 40A, 40B, 40C and 40D. Also, portions of the global data set may be utilized by more than one locality but each locality must have its own distinct copy of this data and any coherence maintained between local data sets must be managed explicitly by a programmer.

To support this new programming paradigm, a second processor called hardware Locality Manager (LM) is added to each PE. The LM monitors program execution and moves data when necessary. This data movement is specified as part of the user's program at the language level and an associated compiler generates separate code for both a PE's CPU and its LM. To ensure program correctness, data synchronization must be supported in hardware. Data movement then proceeds independently of the CPU under synchronization constraints specified in the program. The LM must operate transparently to the CPU so that the CPU can operate efficiently as long as it does not have to wait for data movement to complete. Finally, the CPU's internal cache can be utilized to decrease local memory access latency. 2.

A mechanism for data movement between localities

Figure 4A:
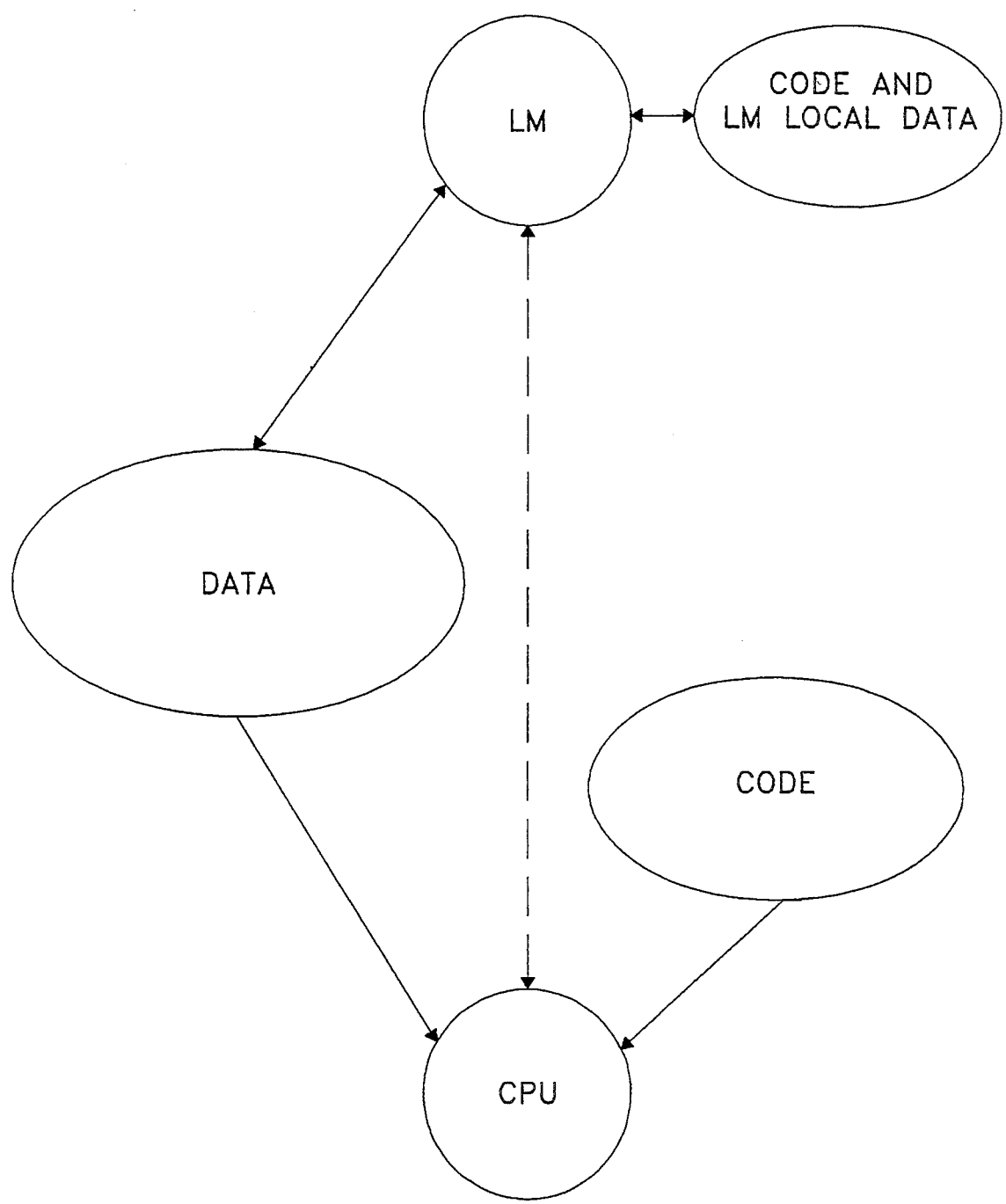
FIG. 4A is a schematic representation of software and hardware entities of a processing element (a locality).

In the previous section, a model for locality and data movement was presented. In this section, a mechanism for specifying data movement between localities will be described whereby each locality comprises a single user process running on its CPU, a hardware locality manager (LM), a set of local data, and code for both the CPU and the LM as shown in FIG. 4A. Within a locality, the user process can execute local code and can read or write its local data. Two basic LM operations, "request" and "release", are defined as follows. The LM may "request" data from another locality (this data must be typed). This "request" is then sent to the LM of the locality containing the "requested" data item (localities must be specified explicitly). This LM must then check if the "requested" data have been "released." Data are "released" to indicate that they are ready to be distributed to other localities. When the LM determines that the data are ready to be forwarded and there is a "request" pending, it sends these data to the "requesting" LM. The LM must then be able to block the user process whenever it attempts to read data for which there is a pending "request."

The "request/release" operations described here are request driven in that no data are moved until they are requested. These semantics are imposed because localities (via their respective LMs) manage their own address space. Thus, data must not be moved until a requesting locality is prepared, because doing so involves modifying data space of that locality. "Releasing" an item allows other localities to obtain copies of a portion of the data space of a locality, however, such access must be explicitly permitted by the locality holding the data. Furthermore, a "released" item is not available to the locality in which it is stored between the time at which it was released and the time at which a fixed number of requests for it have completed. Thus, that portion of the local data space is actually made available to one or more other localities during this time span.

The "release" operation also permits the user to specify a "count" field that indicates a specified number of localities which must request a data item before the data item may be overwritten. The LM will then block a user process if it attempts to write to the data item before it has been requested by the specified number of localities. This can be used to create multiple copies of data items. The multiple copies become individual data items and can be modified individually. This mechanism is similar to multicasting in message passing systems and is provided to facilitate algorithms that require (this read only form of) data sharing. Thus, if k localities need to know a data item containing a partial result from a locality, the locality can release the data item with a release "count" field of k. Such a mechanism, however, does not guarantee consistency between copies of data. Instead, these copies all begin with the same value but may be modified by new localities in which they reside as can any other data item. Therefore, only "read-only" data may be truly "shared" via this multiple release facility.

The LM monitors an event stream from a user process and waits for events indicating when to start interprocessor communication operations. The activities associated with these events are specified in the LM's code. These may include "request" and "release" operations as well as the manipulation of variables local to the LM. The events are specified by tags attached to data references. Tags are assigned at compile time and multiple tags may be associated with a single variable.

To take full advantage of the LM, a program must attempt to schedule the use of data such that data movement can occur concurrently with computation. This scheduling must be done explicitly by the user (programmer) and has a large impact on program performance. Thus, the programmer is forced to consider which data are necessary for a local computation and to determine an earliest point in time at which global data can be "requested" or "released." This job is left to the programmer because it must be done at an algorithmic level. Simply analyzing existing code (either by automatic or semi-automatic methods) will not yield an optimal scheduling of data movement, because the types of automatic transformations that are possible while still preserving a program's semantics are limited. The programmer, however, is in an excellent position to determine when and where data will be needed. The program can then be rearranged to put as much computation as possible between consecutive accesses to data being moved.

Figure 4B:
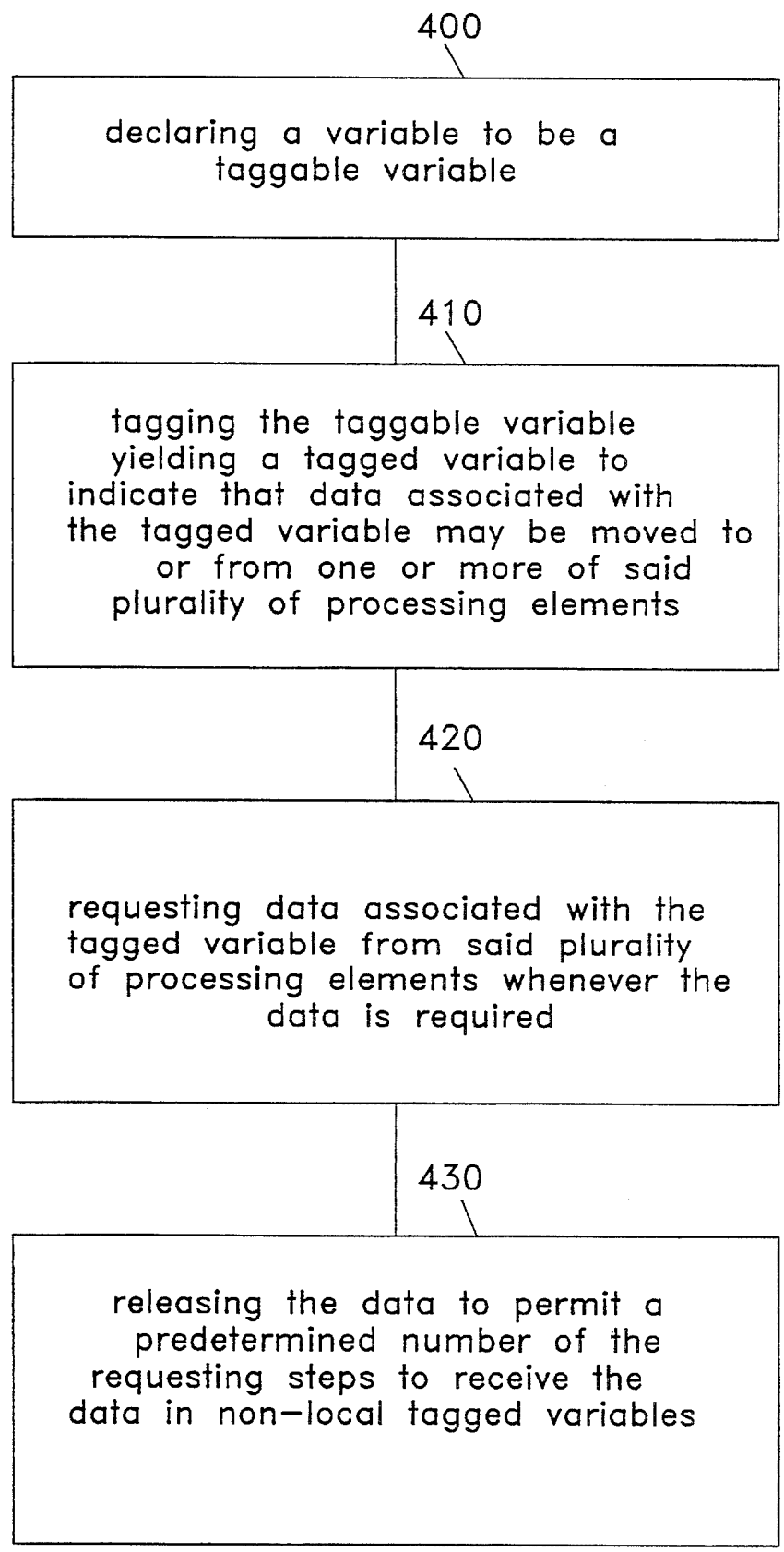
FIG. 4B is a flow chart of the general approach to tagging variables and allowing data associated with those tagged variables to be moved from one processor element to another.

FIG. 4B is a flow chart summarizing the general approach to tagging variables and allowing data associated with those tagged variables to be moved from one processor element to another. In particular, at step 400 a programmer first declares a variable to be taggable. At step 410, the programmer tags that variable or has it tagged during program execution, yielding a tagged variable indicating that data associated with that tagged variable may be moved to or from one or more of the plurality of processing elements. The locality manager issues a request command at step 420 whenever the programmer's code attempts to move data associated with that tagged variable from one processing element to any other processing elements. The locality manager releases that data to permit in accordance with the program a predetermined number of the requesting steps from the one or more processing elements to receive the data in non-local tagged variables as described in step 430.

Note that with hardware support, data movement can actually occur concurrently with computation rather than being interleaved as would occur if a CPU in a PE performs computation and monitored communication. This overlapping of computation and data movement provides memory latency tolerance. An optimal amount of overlap between data movement and computation will be different for every application. However, if complete overlap is possible, data movement latency will not be reflected in program execution time. Additionally, if there is not enough computation to keep a user process busy, but all of it is overlapped with data movement, total program execution time will only reflect data movement time and not computation time. In reality, most programs will fall between these two extremes due to synchronization based latency.

3. Processing Element Architecture

Figure 5A:
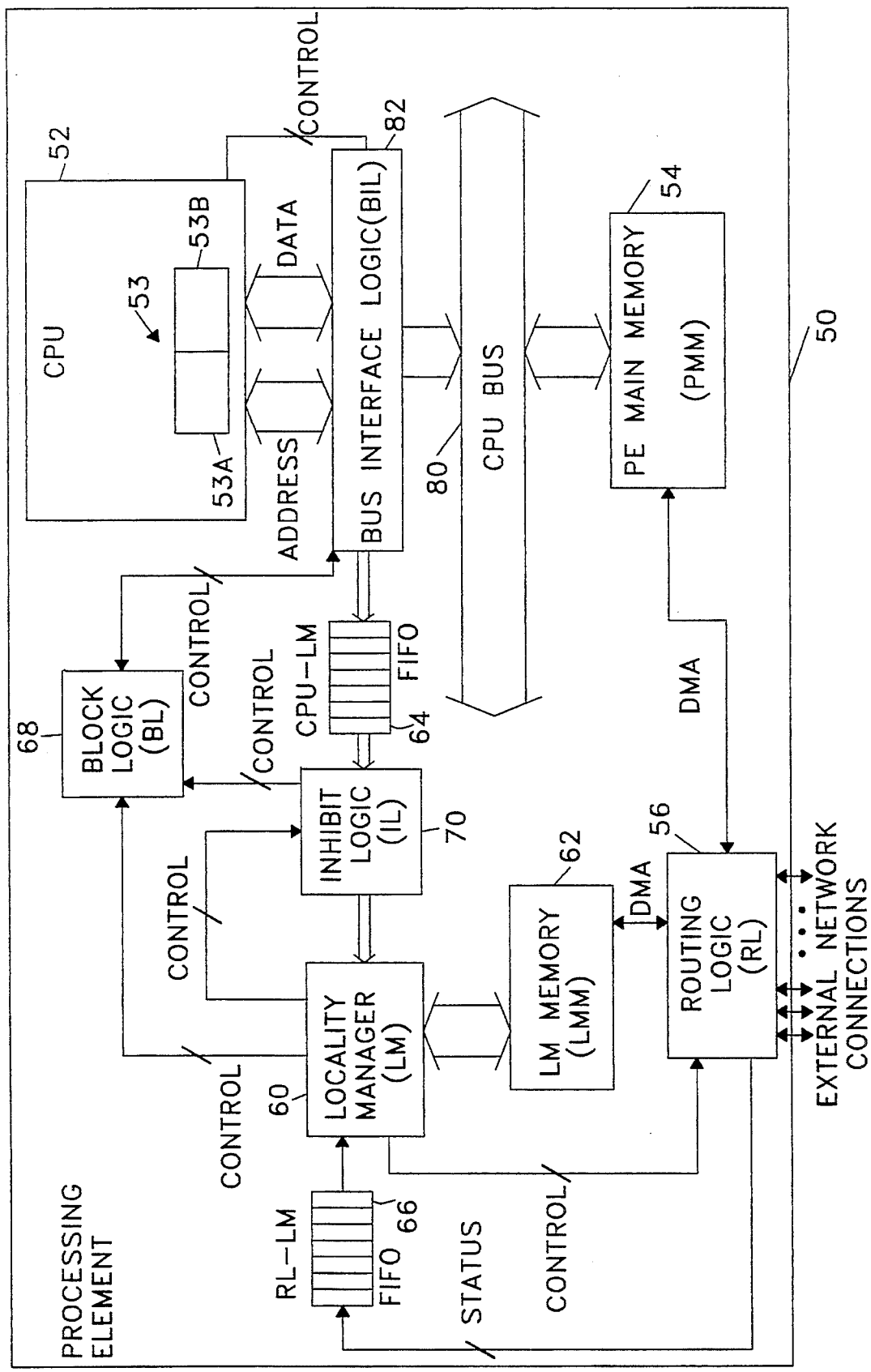
FIG. 5A shows a block diagram of a processing element and FIG. 5B shows a block diagram of a parallel multiprocessor according to an embodiment of the invention.

FIG. 5A shows a block diagram of PE 50 which supports the above-discussed mechanism. Major elements of PE 50 are CPU 52, PE main memory (PMM) 54, routing logic (RL) 56, and locality manager (LM) 60. CPU 52 can be an unmodified, "off-the-shelf," processor such as a high performance RISC processor. It fetches all instructions and data from PMM 54. Further, CPU 52 is assumed to have an internal cache 53 which may be divided into a separate instruction portion 53A and data portion 53B. Finally, CPU 52 must have an ability to externally invalidate cache lines and to externally specify cache lines as write-through or non-cachable and a copy-back default cache policy. At least two CPUs currently support these capabilities; Intel i860XP and Inmos T9000 Transputer. If CPU 52 doesn't have the external cache management capability, then either its internal cache must be disabled or CPU 52 itself must be modified as will be clarified below.

Figure 5B:
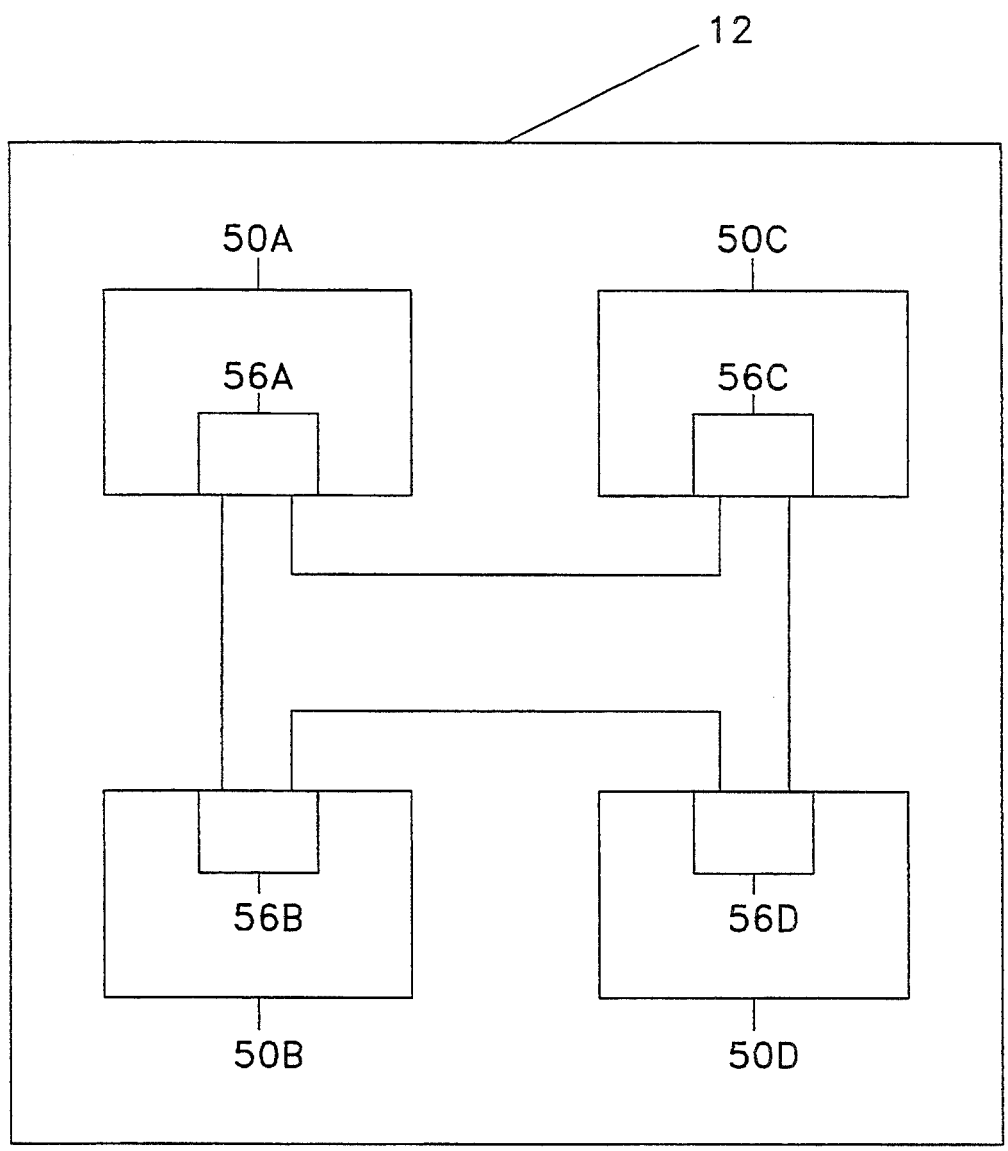

FIG. 5B shows a block diagram of a multiprocessor 12 with PEs 50A–D connected in a point-to-point or multistage network structure with each PE 50A–D as discussed in "Interconnection network for large scale parallel processing," 2nd Edition by Howard J. Siegel, incorporated herein by reference.

Data movement occurs through RL 56 which can be, for example, Intel Direct Connect Module (DCM) or the Caltech Mesh Routing Chip. RL 56 controls sending and receiving of data from PE 50 and can read data from, or write data to, PMM 54 through a DMA channel. Finally, RL 56 acts as a router for data that is not directed to the particular PE 50 in which it is contained.

A primary difference between PE 50 and that of an iPSC/2 is that the latter doesn't have LM 60 and its associated hardware which includes: locality manager memory (LMM) 62, a CPU-LM FIFO 64, an RL-LM FIFO 66, block logic (BL) 68, inhibit logic (IL) 70. This part of the PE architecture will now be described.

LM 60 is an event-driven device and does not have any external control lines. Rather, it is controlled by events that are contained in one of the two queues that feed it. These two queues are CPU-LM FIFO 64 that holds CPU events and RL-LM FIFO 66 that holds RL events.

A user-specified task to be performed by LM 60 is completely described by an ordered triple (V, T, C). Here V is a variable reference, T is a tag, and C is code to be executed by LM 60 when a reference to V containing a tag has occurred. The notion of a tag permits multiple LM actions to be mapped to a single variable and multiple variables to be mapped to the same LM action.

To specify an LM action or task, the programmer must tag a particular variable reference in source code. This tagged reference will generate a CPU event consisting of ordered pair (V, T) where V is the variable reference and T is the tag. LM 60 is responsible for mapping this event to the proper LM task (C). Variables that may be tagged must be declared to be of storage class taggable. All taggable variables are global (in the block-structured language sense) and must be statically mappable to a single physical address (known at load time).

Events are generated when accesses to taggable variables are "tagged." Two major classes of variable references exist. These are:
  (1) "asynchronous" references, which represent references to ordinary PE variables; and
  (2) "synchronous" references, which are references to those variables declared as taggable.

Further, synchronous references are divided into two subclasses:
  (1) "untagged-synchronous" references, which are references to taggable variables that have not been tagged; and
  (2) "tagged-synchronous" references are references to taggable variables that have been tagged.

Note that a taggable variable may be referenced in untagged-synchronous as well as tagged-synchronous fashion. Synchronous references have different cache management and synchronization constraints (as will be described later) and therefore, they are distinguished in this manner even if they are not "tagged." While untagged-synchronous address and each possible tagged-synchronous addresses for a taggable variable appear different to CPU 64, they in fact represent the same physical address in PMM 54. Only tagged-synchronous references generate CPU events.

Figure 6:
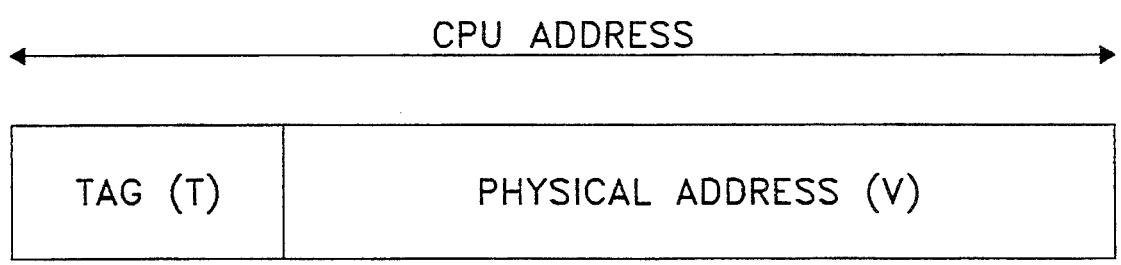
FIG. 6 shows how a CPU address is divided into a tag (T) and a physical address (V).

To indicate whether a reference is tagged-synchronous, untagged-synchronous or asynchronous, physical address lines of CPU 52 are divided logically into two fields, physical address (V) and tag (T) as shown in FIG. 6. Note that V is an actual address of a variable in PMM 54 because all virtual to physical address mapping is performed inside CPU 52. The T field specifies whether the reference is untagged-synchronous, tagged-synchronous, or asynchronous. Further, if it is tagged-synchronous, the tag field indicates what tag is to be passed to LM 60 and whether or not an event is a data event. A data event is an event type that passes not only V and T, but also data being written to, or read from, CPU 80. Thus, the event that will be generated is of a form (V, T), or for data events (V, T, data). The number of bits in the V and T fields is an implementation dependent parameter. Addresses issued on CPU bus 80 past bus interface logic 82, described in the next paragraph always have their T fields set to all zeroes. Note that the T field specified here is physical tag. A virtual tag number specified in user code is mapped to a physical tag at compile time. Thus, the actual value of T may not be the same as the tag given in the user's code. Further, mapping of an event to an LM task may be dependent on program scope as, for example, in a C run-time environment described below. The number of physical non-data and data event tags will be static for a given machine implementation and will depend upon tags on the number of bits in the tag field. Additionally, certain tags may be reserved by a compiler for controlling program scope and other program control functions.

CPU events are passively detected by bus interface logic (BIL) 82 and are enqueued in CPU-LM FIFO 64. BIL 82 has three main functions. First, it detects CPU events by monitoring the tag bits of the CPU's address lines and passes memory accesses through to external CPU bus 80 with the tag bits cleared. If an event is detected, the address, tag, and optionally the data being sent to or received from CPU bus 80 is placed in CPU-LM FIFO 64 after the address and tag. This process of enqueuing an address and tag indicates occurrence of a CPU event to LM 60.

Second, BIL 82 communicates with the Block Logic (BL) 68. BL 68 contains synchronization bits for every word in PMM 54. These bits are used to indicate whether a data item may be written over, or read. This implements synchronization portion of semantics of the "request" and "release" operations. Note that BIL 82 ignores most accesses sent through CPU bus 80. It only checks BL 68 if the reference is synchronous. Further, this hardware blocking is possible because only a single process is permitted on CPU 52. Therefore, when a process blocks, CPU 52 can be blocked without impeding progress of other processes on other CPUs. This mechanism, however, assumes that most wait times will be short and that time spent idle will be less than overhead involved in context switching.

When a synchronous LOAD is detected, BIL 82 simultaneously forwards the address to the CPU bus 80 and BL 68. The data returned on CPU bus 80 is then placed on data pins (not shown) of CPU 52. If BL 68 indicates to BIL 82 that the LOAD can proceed, BIL 82 indicates to CPU 52 that data is ready. Note that this assumes that CPU 52 has the ability to insert wait states if data is not immediately ready by monitoring a "data ready" pin (not shown). When this data ready pin is not asserted, the values on the data pins of CPU 52 are ignored. This process adds no overhead if data is ready immediately, because access to BL 68 is performed in parallel with access to PMM 54. When a LOAD must be blocked, BIL 82 continues polling BL 68 until the reference becomes valid. (Note that a timeout mechanism and exception handler would be necessary to prevent deadlock.) Then, BIL 82 repeats access to PMM 54 and passes a returned value to CPU 52 on its data pins, and indicates to CPU 52 that data is ready.

When a synchronous STORE is detected, BIL 82 internally latches values on data and address pins of CPU 52 and sends the address to BL 68. BIL 82 then polls BL 68 until it indicates that the variable being accessed is writable. When this is detected, the address and data are placed on CPU bus 80 and a write takes place to PMM 54. Then after the write cycle has completed, BIL 82 indicates to CPU 52 that another memory operation may be initiated.

Finally, BIL 82 deals with coherence of cache in CPU 52 in the following manner.

(1) All events must be visible to external hardware, i.e., to BIL 82. References may be serviced by the internal cache. Therefore, BIL 82 must specify to CPU 52 (via control lines) that cache lines containing tagged-synchronous references may not be cached.

(2) Taggable references may be cached. However, because they refer to the same address in PMM 54 as one or more tagged-synchronous references, the value in PMM 54 must always be the same as the cache copy (because the tagged-synchronous reference will not check the cache). Thus, all modifications to taggable variables must be sent immediately to PMM 54. This is easily achieved by specifying a write-through cache replacement policy for untagged-synchronous references.

(3) One final problem is in enforcing synchronization constraints on untagged-synchronous references. This problem is twofold.

(a) Because untagged-synchronous references are cached and tagged-synchronous references are not, a LOAD of an untagged-synchronous variable after a tagged-synchronous access to the same variable may not be sent to external CPU bus 80. However, if that tagged-synchronous access causes LM 60 to perform a request operation, data in the cache may no longer be valid. Thus, cache lines corresponding to the untagged address of the taggable variable being referenced in tagged-synchronous fashion must be invalidated.

(b) A second aspect of this problem is the case where the untagged-synchronous reference to a recently tagged variable occurs before LM 60 has processed an event generated by the tagged-synchronous reference. In this case, a LOAD or STORE may violate synchronization constraints because the "request" or "release" operation initiated by the tagged-synchronous reference has not yet been executed by LM 60 (i.e., the reference is still in CPU-LM FIFO 64). BIL 82 must therefore block both reading and writing of the variable immediately after an event, regardless of the LM task being initiated. This must then be undone by LM 60 if it was not necessary.

STOREs to taggable variables may add to CPU bus 80 traffic. This, however, is not expected to be a problem because most references are asynchronous and CPU bus 80 queues on most RISC CPUs keep execution units of CPU 52 functioning from its cache and registers while a STORE takes place, even if CPU bus 80 is stalled.

Another drawback is that tagged-synchronous references cannot be cached. Thus, these references will always take longer to complete than asynchronous and untagged-synchronous references. Therefore, these types of references must be avoided as much as possible. Avoiding these references also reduces burden on LM 60 and on inhibit logic 70 (which will be described later in conjunction with FIG. 7). Thus, as part of a program optimization process, tagged-synchronous accesses must be avoided except when needed.

Finally, there is a problem of unnecessary synchronization latency. When untagged-synchronous references occur to a variable for which there is an event currently in CPU-LM FIFO 64, CPU 52 will be delayed unnecessarily. This, however, is a primary consideration in achieving latency tolerance. Namely, to achieve latency tolerance, references to variables that are being processed by LM 60 must be far enough ahead in the program to allow LM 60 to complete the task triggered by that event. This is true for all tagged-synchronous references, not just those that trigger "request" or "release" operations. If the program can satisfy this constraint at all times, full latency tolerance will be maintained. If the program ever violates this constraint, synchronization latency will be introduced. This conclusion is based on empirical observation of programs that already perform well on non-shared memory MIMD systems. Thus, program behavior described above is expected to be easily found and exploited, and not unnaturally imposed on the programmer.

Between BIL 82 and LM 60 is Inhibit Logic (IL) 70 shown in FIG. 5A. IL 70 filters events being sent to LM 60. IL 70 can be set to filter events based on their tag and address fields so that LM 60 need not be over-burdened with requests of no consequence. Further, a "count" field (an integer) is provided to allow filtering of the first "count"—1 events with a specified tag and address.

Figure 7:
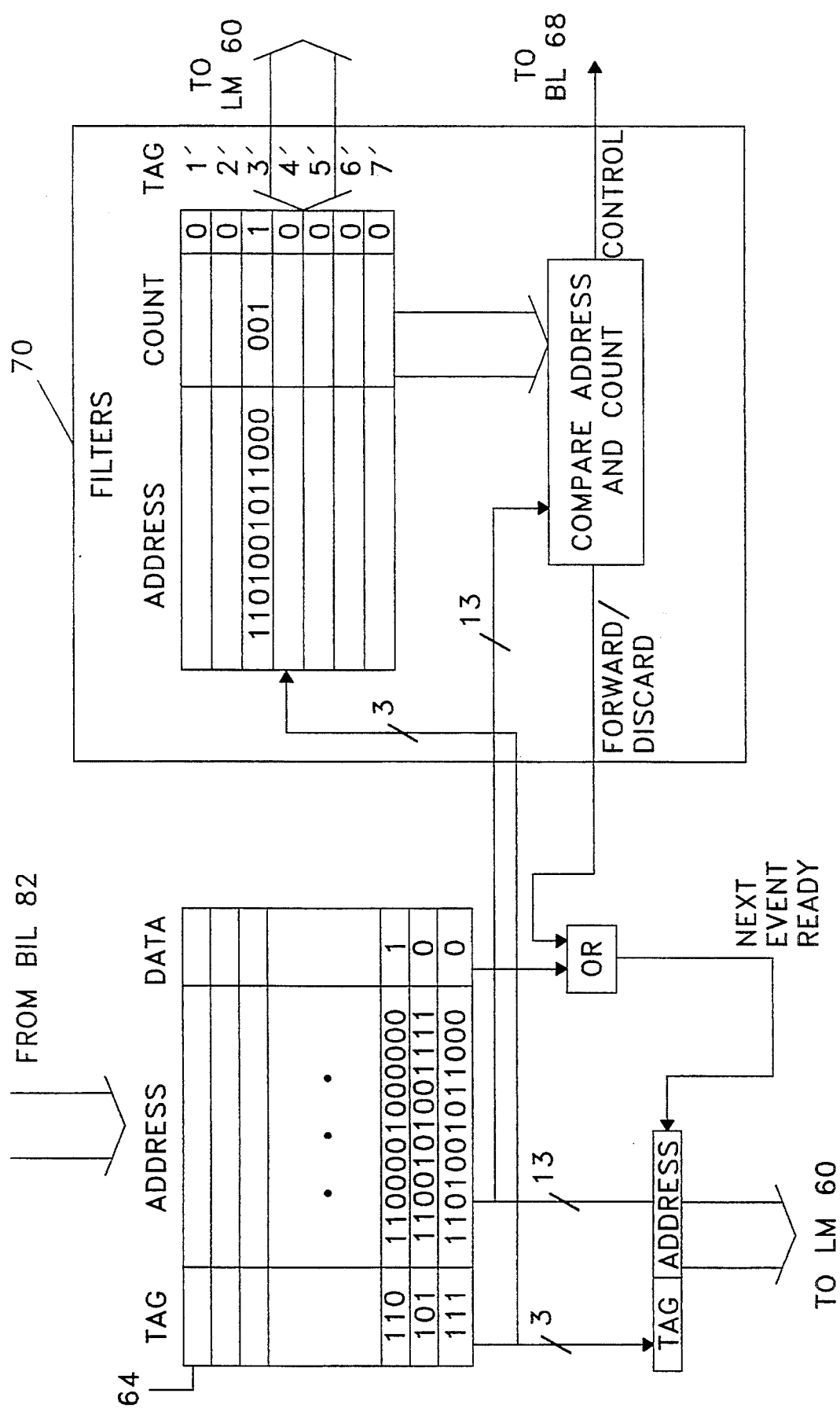
FIG. 7 is a block diagram of inhibit logic unit 70 of FIG. 5A when the tag field is 3-bits.

FIG. 7 shows an example of a situation in which there are several events in CPU-LM FIFO 64, each of which consists of a 3-bit T field, and a 13-bit V field. Further, a bit has been added to indicate if information is an event or data. If data bit in FIG. 7 is set, the other 16 bits represent data portion of a data event. Data in the CPU-LM FIFO 64 automatically bypasses IL 70 and is sent directly to LM 60. The event at the head of the queue carries a tag value of 3. This value is checked against an entry in filter 3' of the IL 71. If there is a valid entry in this filter, IL 70 compares address fields in filter 3' and the head of CPU-LM FIFO 64. If these do not match, the head of CPU-LM FIFO 64 is discarded If not, as in this example, "count" field is decremented. Should the decremented "count" field be anything other than 0 (after decrementing), the head of CPU-LM FIFO 64 is discarded. If it is 0 after decrementing (as in the example shown), filter 3' is invalidated and the event is passed to LM 60.

IL 70 can only filter events at the head of event queue because it may be set or reset by tasks performed in response to events currently in CPU-LM FIFO 64. After filtering an event, IL 70 also must undo automatic blocking of the tagged address performed by BIL 82 when the event entered CPU-LM FIFO 64. IL's filters 1'-7' are set by inhibit commands in LM code as described in Section 5 (Language Support). Its state also can be loaded or stored by LM 60 in response to changes in program scope as will be described in section 4.

RL 56 communicates with LM 60 using events. RL events are enqueued in RL-LM FIFO 66 upon completion of an operation. Format of these events is dependent on actual implementation of RL 56. Basic RL operations or actions include:

(1) sending a request message to another RL requesting it to send a data item,
(2) sending an item from PMM 54 to another RL (not shown),
(3) receiving an item from another RL (not shown) and placing it in PMM 54 or LM memory (LMM) 62, or
(4) copying data from the LMM 62 to PMM 54.

While LM 60 initiates actions (1), (2), and (4), they are executed asynchronously and LM 60 must be notified when they are complete. Action (3) is actually performed in response to another PE's RL having performed action (2). Further, a data item being received must be matched to one that was requested by PE 50 before it can be stored. Such a "protection" mechanism may be enforced in either LM 60 or RL 56, depending on the implementation.

Up to this point, hardware static and non-programmable hardware has been described. However, LM 60 is a programmable device that is controlled by a combination of both user code and a run-time environment. LM 60 can be a simple microprocessor such as Intel 960SA. It should be able to perform memory movement, integer arithmetic, and logical operations. Also, it preferably has a stack and one or more registers. Further, LM 60 will have "built-in" instructions for controlling FIFOs, BL 68, IL 70, and RL 56 because these operations are performed often. Thus, LM 60 should be capable of executing normal high level language code (though with only integer arithmetic) as well as performing special control operations.

LM 60 may be designed using either hard-wired or microcoded control depending on its speed requirements. Actual speed necessary for LM 60 depends on application code, CPU 52 and CPU bus 80).

4. Run-time environment

Because LM 60 is a programmable device, little functionality is built in. Rather, most of its functionality is part of its run-time environment (RTE). While more than one RTE may be supported on this architecture, this section describes a C language RTE (C-RTE) which consists of kernels for both CPU 52 and LM 60 as well as an integral compiler implementing an extended version of C described in section 5.

Under C-RTE, only a single program may execute on each PE 50. This CPU-resident kernel deals with bootstrapping CPU code and LM code as well as exception handling, but remains inactive during program execution. I/O is performed utilizing library routines compiled into the user's program. CPU 52 can execute code normally as specified by C-UNIX programming model with certain restrictions (e.g., forking as well as IPC between processes on a single CPU 52 are not allowed because only a single active process exists on each processor). The LM kernel, however, remains active during program execution. Upon booting PE 50, user code is loaded into both PMM 54 and LMM 62. In addition, space is allocated for global LM variables and CPU variables as well as taggable CPU variables. One of the LM kernel's main responsibilities is to maintain a database of data items being manipulated by "request" and "release" operations. This database includes information about starting address, length, release count, and status of data items. Initially, this database will contain records for each taggable variable. However, entries may be added when data items smaller than those defined at compile time are used (i.e., the vector "request" and "release" operations described in section 5). This database is manipulated by "request" and "release" operations as well as any other data movement operations.

The LM kernel then begins program execution by looking for events in CPU-LM FIFO 64 and RL-LM FIFO 66. In C-RTE, every program scope has a unique mapping of events to tasks. Thus, an initial detected event will be a "system" event indicating entry of CPU 52 into "main." Note that system events are inserted by the compiler, not the user or the kernel. This event will cause the IM kernel to switch the LM's scope to that specified for "main." This scope may include local LM variables (which are stored on the LM's stack), as well as a set of mappings from events to tasks. Tasks consist of sections of LM executable code that may include "request," "release" or "inhibit" operations, as well as arithmetic or logical operations (to be performed on LM variable). When LM 60 detects a CPU event, it looks at current mapping and begins executing an appropriate task. This task will run until completion. Note that "request" and "release" operations are not synchronous. A "request" or "release" operation in an LM task merely schedules an operation to be performed when it is possible. This may be subject to delays due to blocking constraints as well as other "request" and "release" operations that have not completed.

When program scope changes, a system event is generated to indicate entering or leaving of a scope. Entering a new scope causes the LM kernel to place any needed state information on the stack. This includes the current state of IL 70 as well as any general purpose or status registers. Then, a new scope specified by the event will be created. This new scope is indicated by information carried in a system data event inserted by the compiler. Upon leaving a scope, a system non-data event is generated and the last scope stored on the stack is restored. This includes restoring event mappings, local variables, registers, and the state of IL 70.

RL events are handled differently from CPU events. These are not directly controlled by user code. Rather, the system kernel has built-in tasks for each RL event. These tasks may include:

(1) checking whether a data item being requested was released and, if so, sending the data and decrementing its count field; if not, scheduling the data item to be sent after it has been released;

(2) determining whether a data item being received by RL 56 was requested and whether the item may be written to PMM 54 (i.e., whether its release "count" field is 0) or whether it should be buffered; and (3) unblocking a released data item that has been sent a proper number of times (as determined by its release "count" field), or a requested item that has been received and is in PMM 54.

Further, some actions may be initiated after completing another operation. These include:

(1) moving a buffered data item from LMM 62 to PMM 54 after it has been released "count" times;

(2) initiating a new "request" or "release" operation on a data item if one was scheduled while a last one was pending; and (3) initiating a send operation to satisfy a pending "request" operation on a data item that was just released.

5. Language support

The C-RTE is integrated closely with a C language compiler. This compiler utilizes an extension of C allowing the programmer to explicitly specify in the application code when the user process should generate an event that will implicitly trigger execution of a "request" or "release" operation in LM 60. The programmer also specifies tasks to be performed by LM 60 when it is presented with the event. To support this, an extended version of the C programming language was developed.

A taggable variable, b can be declared as follows:
taggable float b;
float a, c; Then, a variable reference is tagged by using the @ symbol as follows:

$a = b@0 + c;$

This code specifies that an event (&b, 0) with a variable reference &b (the address of b) and tag number 0 will be generated after the reference to b has occurred. Using this notation, the above expression is read "a is assigned b tagged with 0 plus c."

Code to be executed by LM 60 when an event tag is generated is specified by a locality manager code "lmc" statement. An "lmc" statement contains the actions to be initiated for each event generated by the function containing it. Code is associated with each of these events and, optionally, LM variables may be defined. While the primary purpose of "lmc" code is to execute "request" and "release" operations, other aspects of the "lmc" statement will first be discussed.

Variables defined within the "lmc" statement are only active within a scope in which that "lmc" statement occurs. Further, global LM variables may be defined in the outermost program scope by declaring them of storage class "lm." An "lmc" statement resembles the C "switch" statement. An example is shown below.

```
/* a global lm variable, active in all lm statements unless
a local lm variable "x" is declined */
lm int x;
/* "b" is a taggable variable */
taggable int b;
void foo()
{
    int a, c;
    /* The main program body is left out for this example */
    a = b@0 + c; /* an assignment with a tag 0, generates
    the event (&b, 0) */
    /* The rest of the body of foo */
    lmc {
        /* local LM variables, these only exist within a single
        instance of foo */
        int temp, count;
        tag 0:
            /* Usual C code, to be executed bu the LM after
            receiving an event with tag 0 and any variable
            reference */
            break;
        tag 1:
            /* More LM code, to be executed upon receiving an
            event with tag 1 */
            break;
        /* Possibly more tags */
    }
}
```

Such syntax allows all tags to be specified in one place within a function. Because all event tags are local to a function, each function that will contain tags must contain an "lmc" statement.

To further enhance both functionality and efficiency, some intrinsically defined variables and events are provided. For example, "loc_num" is always defined to be a locality number in which LM 60 is running (this is normally a PE number containing the locality). This is defined both within the "lmc" statement and in the main body of the function.

An address of a variable reference that generated an event is available within lmc block as an intrinsic variable called "reference." This address may then be used to determine which variable reference generated a specific event if multiple references are mapped to a single LM action (e.g., if the event (&b, 0) is being processed, reference is &b). Note that an address of a variable reference will be determinable before run-time because taggable variables must be global and are statically allocated.

An intrinsic function that can be utilized to filter events is the inhibit function. By calling "inhibit," it is possible to specify an address that must accompany a next event with a given tag. Additionally, a "count" field is provided to specify how many events with the address and tag must be observed before an action is to take place. Thus, all events, with that tag, that do not have the specified address, are ignored. Further, the first "count" -1 events with the desired address and tag are ignored and the filtering mechanism must be re-initialized after each usage. Thus, when the event that is specified by the "inhibit" function is detected for the "count"th time, the filter is automatically disabled. This provides an efficient mechanism for filtering events and can be useful for operations on data structures where events need to be ignored until the program is finished using a data structure. This is similar to placing an "if" statement and a counter at the beginning of the event code, but has lower overhead and is self disabling. For example, the following code shows a vector A being accessed sequentially from element 0 to element 99 and only a final reference to data structure, A, is of interest.

```
taggable float A[100];      /* a taggable array */
taggable int i;             /* a taggable integer */
float B[100], C[100];       /* other global variables */
void foo()
{
    int j;
    /* generates event (&i, 0) when loop is initialized */
    for (i@0=0; i<100; i++)
        for (j=0; j<3; j++)
            C[i] = A[i]@1 * B[j]; /* generates event (&A[i],
            1) */
    lmc {
        /* set inhibit for tag 1 at start of loop */
        tag 0: inhibit(1, &A[99], 3);
        break;
        tag 1: /* LM code to be executed when A[99] is accessed
        for the third time */
            break;
    }
}
```

In order to facilitate movement of data from the user process to LM 60, special data events are defined. These events not only pass the tag and address of a reference to LM 60 but also the value pointed to by the address. This value is made available through de-referencing the intrinsic variable *reference. Data events are specified by tagging references with word "data<N>" where "<N>" is a data event number (i.e., "data0, " "data1," "data2, " etc.). Thus, one could set the value of an lm variable (e.g., "lm_i") to that of a program variable (i) using the data event as shown below.

```
taggable int i;            /* a taggable integer */
voide foo()
{
    i@data0=5; /* generates a data event */
    lmc {
        int lm_i;
        tag data-: lm_i=*reference;
        break;
    }
}
```

Up until now, only the mechanism for specifying events and the code blocks associated with events has been described. What is missing is the ability to move data through a network using these mechanisms. To accomplish data movement, the "request" and "release" operations, as described earlier, may be executed from within an "lmc" block. "Request" has the following syntax:

```
req(<loc_addr>, <rmt_addr>,
    <rmt_loc_num>);
```

Here, <loc_addr> is the address of a variable in which a requesting locality will store the desired variable upon arrival. <rmt_addr> is the address where a remote or releasing locality accesses the desired variable. Finally, <rmt_loc_num> is a locality number from which data is being requested. Note that only taggable variables may be requested or released. Thus, both <loc_addr> and <rmt_addr> must be pointers to taggable data structures. This is necessary because of added synchronization constraints required for data that is requested or released. Additionally, a variable found in <rmt_addr> must be of a same data type as that in <loc_addr>. A "request" command operates on typed data and therefore involves the entire data structure pointed to by <rmt_addr>. E.g., if <rmt_addr> is a pointer to a one dimensional array of integers of length 5, the entire array (all 5 elements) is moved, not just the first element pointed to by <rmt_addr>. The "release" command is used as follows:

rel (<loc_addr>, <count>);

Here, <loc_addr> is again the address of the variable being released within a locality. Additionally, <count> is the "count" field specifying a number of times the value must be requested by other localities before this locality may overwrite it as described before.

Special vector versions of these functions are also available to facilitate movement of segments of a vector rather than an entire vector. A vector "request" command is used as follows:

vreq(<loc_addr>, <l_start>, <l_end>,
  <rmt_addr>, <r_start>, <r_end>,
  <rmt_loc_num>);

Here, all the parameters are as stated above with the addition of the <l_start>/<l_end> and <r_start>/<r_end> pairs. These specify starting and ending points in the vectors pointed to by <loc_addr> and <rmt_addr> of segments to be affected by the "request" command. Note that <l_end>-<l_start> must be equal to <r_end>-<r_start>. Finally, a vector "release" command is used as follows:

vrel(<loc_addr>, <l_start>, <l_end>,
  <num>);

As in the vector "request" command, <l_start> and <l_end> specify a range of values to be released. Note that this segment must match the segment being requested. The vector commands merely change chunk size from that of an entire vector to a segment of the vector.

A detailed example of how to use of this extended version of C will be presented in order to show how such an extended language can be used to facilitate efficient data movement which in turn supports effective management of program locality.

6. Matrix Multiplication Example

The following parallel program for a multiprocessor according to FIG. 5B and utilizing the above language extensions will now be presented.

Code for the entire program is shown below.

```
A parallel matrix multiplication program
1   /* Matrix multiply of an NxN matrix with P localities */
2   /* N/P vectors per locality */
3   /* A is a row vector */
4   /* B and C are column vectors */
5
6   /* rows of A within the locality */
7   taggable float A[MAXNdivP][MAXN];
8
9   /* problem size, per node problem size */
10  taggable int N, NdivP;
11
12  /* taggable loop counter variable */
13  taggable int i;
14
15  /* global lm copies of problem size, per node problem size
       variables */
16  lm int lm_N, lm_NdivP;
17
18  /* columns of B and C within the locality */
19  float B[MAXN][MAXNdivP], C[MAXN][MAXNdivP];
20
21
22  main(){
23
24  /* code setting vector_length, P, and initialize A, B, and
       C is left out */
25
26      N@data0 = vector_length;
27      NdivP@data1 = N/P;
28      matmul();
29
30      lmc {
31          tag data0:
32              lm_N = *reference;
33          break;
34
35          tag data1:
36              lm_NdivP = *reference;
37          break;
38      }
39
40  }
41
42  /* Calculates C=AxB*/
43  void matmul()
44  {
45      unt j, v, q;
46
47      for (i@1 = 0; i<P; i++) /* generate event (&i, 2) upon
                                  initializing loop */
48
49  /* v is the column number of A within each locality
      (virtual column number) */
50      for (v = 0; v<NdivP; v++)
51
52          for (j = 0; j<N; j++){
53              for (q = 0; q<NdivP; q++)
54                  c[(v+i*NdivP+
                      loc_num*NdivP)%N][q] +
                      A[v][j]@0*B[j][q];
55
56
57
58      lmc {
59          int lm_v;
60          tag 0:
61  /* release the A row vector (it is no longer needed) */
62          vrel(A[lm_v], 0, lm_N-1, 1);
63
64  /* request the A row vector from the locality on your left
      (loc_num+1)%N); */
66
67  /* increment lm version of v */
68          lm_v = (lm_v+1)%lm_NdivP;
69
70  /* set inhibit for the next row of A, inhibit tag 0 until
71     last element of the next row is accessed N/P times */
72              inhibit(1, &A[lm_v][lm_N-1], lm_NdivP);
73          break;
74
75          tag 1:
76  /* set inhibit for the first row of A, inhibit tag 0 until
77     last element of the next row is accessed N/P times */
78              inhibit(1, &A[0][lm_N-1], lm_NdivP);
79          break;
80
81      }
82  }
```

Segments of that code are reproduced here for convenience. Basic operation performed by this code is multiplication of two N×N floating point matrices (A and B) utilizing P localities with a result stored in a floating point matrix C, where N and P are integers, N>P and N/P is an integer (so N/P is the number of vectors per locality). The main computation simply involves multiplying elements of A and B and adding them to elements of C. In particular, data access patterns and data movement between localities required will be described in detail.

Matrix A is stored as an array of row vectors in each locality. There are N/P of these row vectors in each locality. The B and C matrices are stored as arrays of column vectors. There are also N/P of these column vectors in each locality. Each row vector of A must be multiplied by every column vector of B and a resulting value must be placed as an element of C whose row number corresponds to that of the A vector and whose column number corresponds to that of the B vector. Thus, if this was done with a single locality (i.e., P=1), a computational kernel would appear as follows:

```
for (a=0; a<N; a++)
    for (b=0; b<N; b++)
        for (c=0; c<N; c++)
            C[b][c]=C[b][c]+A[b][a]*B[a][c];
```

Now, assume P>1 (note: N/P must still be an integer). Locality 0 will now contain columns 0 through (N/P)−1 of B and C as well as rows 0 through (N/P)−1 of A. Locality 1 will now contain columns (N/P)−1 through 2(N/P)−1 of B and C as well as rows (N/P)−1 through 2(N/P)−1 of A. In general, Locality x will contain columns (xN/P) through ((x+1)N/P)−1 of B and C and the same rows of A. Thus, in the kernel of the algorithm, indices must match this mapping. This computational kernel is as follows:

```
for (i@1 = 0; i<P; i++) /* generate event (&i, 1)
                            upon initializing loop */
/* v is the column number of A within each locality
   (virtual column number) */
    for (v = 0; v<NdivP; v++)
        for (j = 0; j<N; j++){
            for (q = 0; q<NdivP; q++)
C[(v+i*NdivP+loc_num*NdivP)%N][q] =
C[(v+1*NdivP+loc_num*NdivP)%N][q]
  + A[v][j]@0*B[j][q];
```

Here, j is the same as a in the previous example. It is the column of the element of the A row vector being multiplied. Instead of c, q represents the "virtual" column number of both B and C. This is not an "actual" column number because localities only have N/P (NdivP) columns of B and C. Actual column numbers range from (loc_num)(N/P) to (loc_num+1)(N/P)−1. Further, v replaces b as the "virtual" row number of a row of A. Initially (when i=0), v will range from (loc_num)(N/P) to (loc_num+1)(N/P)−1. Thus, for i=0, the columns of the C matrix in each locality are represented by loc_num(N/P)+v (note NdivP=N/P and v ranges from 0 to N/P). This is also the range of the A row vectors when i=0.

Figure 8A:
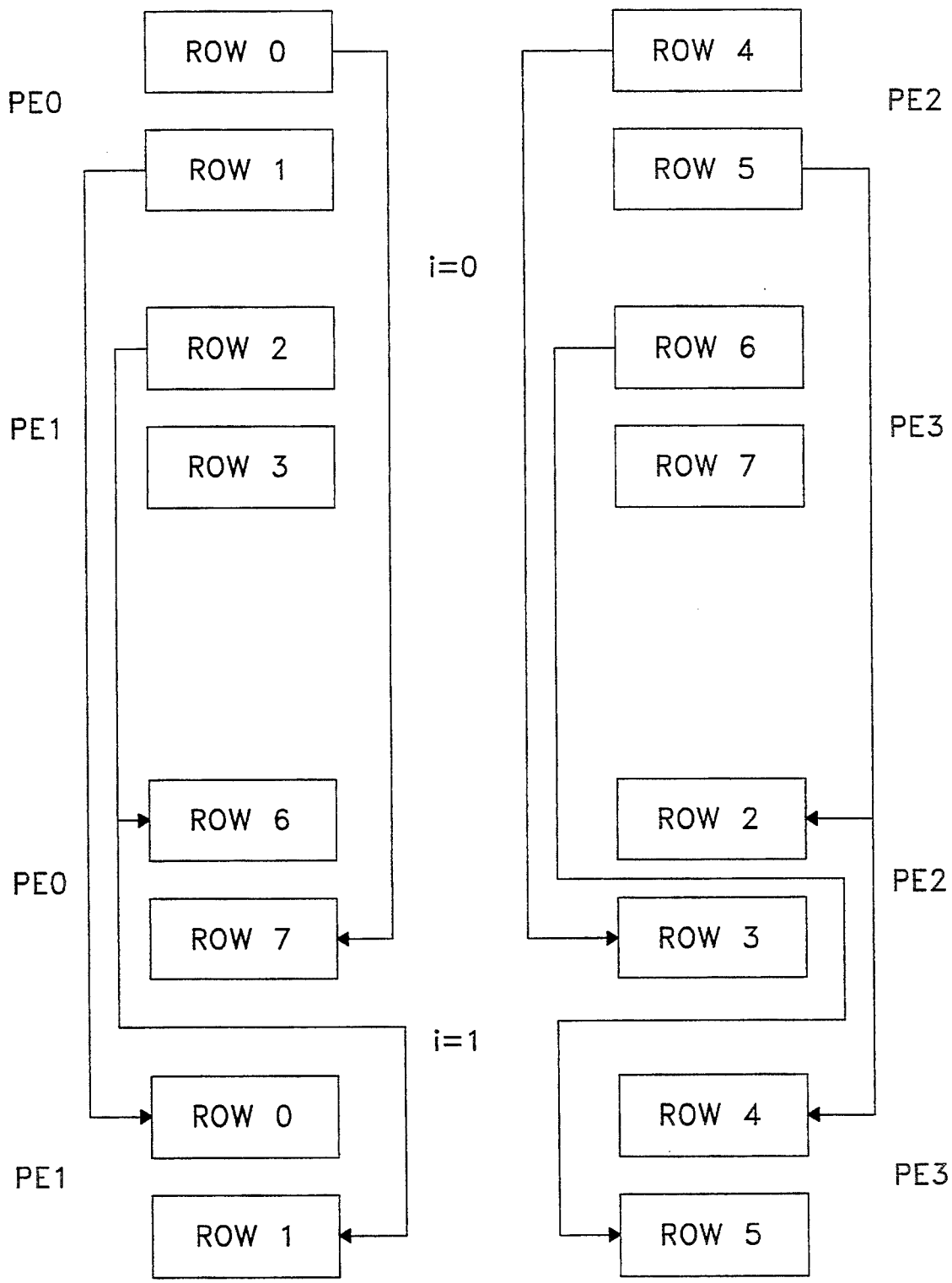
FIGS. 8A and 8B illustrate data movement in matrix multiplication for a loop variable i, where i=0, 1 and i=2, 3, respectively.
Figure 8B:
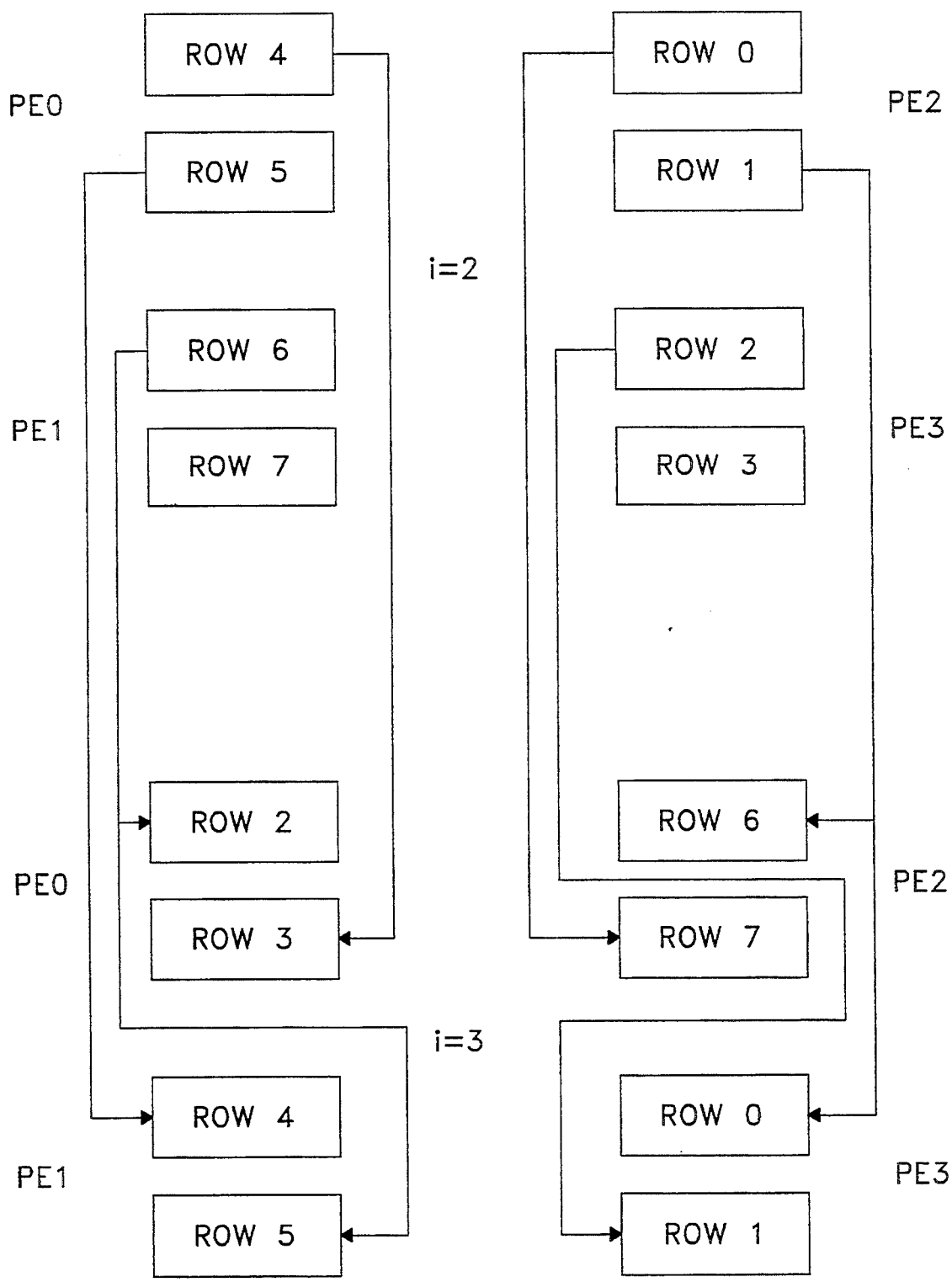

As written, this kernel suffices only for the data initially in localities (i=0). However, in order to complete operation, the row vectors of A must be moved through the localities such that each locality will have each of them at some point. This is done by moving rows of A to locality number (loc_num−1) modP after performing all operations utilizing elements of the row. Thus, between all pairs of i loop iterations, all A row vectors are shifted to this locality and at the start of each i loop, a locality will have rows (N/P) (i+loc_num) through (N/P) (i+loc_num+1)−1. This data movement is shown for the case where N=8 and P=4 in FIG. 8A and FIG. 8B. In these figures, the A matrix moves through each of these localities until each locality has had access to all rows of A. All computations utilizing each row of A are done while it is contained in the locality.

The "lmc" blocks used to perform this data movement will now be described. Initially, the value of N (the vector length) and N/P (the number of vectors per locality) are passed to LM 60 through two data events in main() as follows:

```
lmc {
    tag data0:
        lm_N = *reference;
        break;
    tag data1:
        lm_NdivP = *reference;
        break;
}
```

The "lmc" block for "matmul"() is as follows: A first event defined in this block is (&i, 1) which is generated when the i loop is initialized. This event causes "inhibit" to be called so that all events tagged with a 0 except the final access to the last entry in the A vector (A[N−1]) will be filtered. Events with tag 0 will be generated with each access to elements of the A vector. This event will be generated when each multiply-add is executed inside the q loop. When the last element of vector A is used, LM 60 filters NdivP−1 uses of the variable for each iteration of the q loop, then vector A is released to a single requester. LM 60 then requests the same vector from the locality loc_num+1 to be stored in the same location as the old vector. Note that "vector requests" and "vector releases" are used because N may not be equal to MAXN. Further, "inhibit" is called to set up a filter for a next row of A.

Because vectors are "requested" and "released" as they are used, data movement need not complete until that same vector is used in the next iteration of the "i" loop. With a large enough "N/P," this data movement should have enough time to complete before it is needed. However, as "N/P" decreases, there may not be enough time for the data movement to complete and accesses to A may have to be blocked until data movement has completed.

```
lmc {
    int lm_v;
        tag 0:
/* release the A row vector (it is no longer needed) */
            vrel(A[lm_v], 0, lm_N−1, 1);
/* request the A row vector from the locality on your
   left (loc_num−1) */
            vreq(A[lm_v], 0, lm_N−1, A[lm_v], 0, lm·N−1,
                 (loc_num+1)%N);
/* increment lm version of v */
            lm_v = (lm_v+1)%lm_NdivP;
/* set inhibit for the next row of A, inhibit tag 0
   until last
element of the next row is accessed N/P times */
            inhibit(0, &A[lm_v][lm_N−1], lm_NdivP);
            break;
        tag 1:
/* set inhibit for the first row of A, inhibit tag 0
   until last
element of the next row is accessed N/P times */
            inhibit(0, &A[0][lm_N−1], lm_NdivP);
            break;
}
```

6. Summary

Summarizing, a method and apparatus was presented for reconciling communication and locality via an integrated hardware and software environment implementing a locality based programming model to tolerate latency. By exploiting locality naturally present in an application, a programmer is able to overlap communication and computation using a hardware locality manager. The use of an independent locality manager allows computation to proceed independently from communication subject to necessary synchronization constraints that are enforced by special hardware. This model provides latency tolerance for properly structured code without requiring a very high degree of parallelism (one that is much larger than the total machine size). Rather, it utilizes recent maturity in pipelining of "off-the-shelf" RISC CPUs and their associated mature compiler technology to exploit fine-grained parallelism as well. An extended form of C was presented and its functionality was described. Finally, a detailed example utilizing this extended version of C was provided.

Obviously, numerous and additional modifications and variations of the present invention are possible in light of the above teachings. It is therefore to be understood that within the scope of the appended claims, the invention may be practiced otherwise than as specifically claimed.

What is claimed is:

1. A parallel multiprocessor for executing code resulting from a program which has been compiled, said code including locality manager code and cpu code, comprising:
   a plurality of processing elements connected to each other and arranged in an interconnection structure, each processing element having a unique address within said interconnection structure, each processing element comprising:
   central processing means for processing data by executing local cpu code which is a part of said cpu code that is local to said central processing means; and
   locality manager processor for controlling data movement between processing elements which are cooperating on a single task by executing, upon the occurrence of specified events resulting from execution of said local cpu code, local locality manager code which is a part of said locality manager code that is local to said locality manager processor, said local locality manager code indicating when data shared among two or more of said processing elements can be released for movement between processing elements and when non-local data from another processing element is requested, wherein said central processing means and said locality manager processor are separately programmable and operate independently of each other as specified in said local locality manager code and said local cpu code.

2. The parallel multiprocessor claimed in claim 1, wherein each processing element further comprises a processing element main memory connected to said central processing means for storing local data and the local cpu code.

3. The parallel multiprocessor claimed in claim 2, wherein each processing element further comprises cache memory in said central processing means for storing the local data; and
   main memory updating means for updating local data stored in said processing element main memory in accordance with the local data stored in said cache memory.

4. The parallel multiprocessor claimed in claim 3, further comprising a locality manager memory for storing the local locality manager code.

5. The parallel multiprocessor claimed in claim 3, further comprising routing logic means having direct access to said locality manager memory and to said processing element main memory and connected to said locality manager processor for routing data in accordance with said locality manager processor.

6. The parallel multiprocessor claimed in claim 1, wherein said central processing means is a reduced instruction set computer.

7. A method of controlling data and control flow in the parallel multiprocessor of claim 1 as specified in said program, comprising the steps of:
   declaring a variable to be a taggable variable in the program;
   tagging the taggable variable in the program yielding a tagged variable to indicate to the processing elements in the multiprocessor that data associated with the tagged variable at one processing element may be moved to or from one or more of said plurality of processing elements;
   requesting data as specified in the program associated with said tagged variable by one or more of said plurality of processing elements other than said one processing element whenever the data is required at said one or more processing elements; and
   releasing said data to permit by specifying in the program a predetermined number of said requesting steps from said one or more processing elements received by said one processing element to receive the data in non-local tagged variables.

8. The method claimed in claim 7 further comprising the step of controlling data movement between processing elements which are cooperating on a single task by executing local locality manager code using the locality manager processor, wherein the local locality manager code indicates when data shared among two or more processing elements can be released for movement between processing elements and when non-local data which is data local to another processing element is requested.

9. The method claimed in claim 7 further comprising the step of storing portions of said cpu code as local cpu code in respective processing element main memories.

10. The method claimed in claim 9 further comprising the step of executing said local cpu code using the central processing means in respective processing elements.

11. The method claimed in claim 7 further comprising the step of storing local locality manager code, local data and non-local data in respective locality manager memories.

12. The method claimed in claim 7 further comprising the step of specifying tasks to be performed by said locality manager processor in ordered triples each ordered triple including a variable reference, a tag and local locality manager instructions corresponding to each task, said local locality manager instructions comprising a portion of said local locality manager code.

13. A parallel multiprocessor comprising:

a plurality of processing elements connected to each other in an interconnection structure, each processing element having a unique address within said structure and comprising:

a processing element main memory for storing local cpu code;

a central processing unit having a cache memory with an instruction portion and a data portion, for executing the local cpu code, and for reading from and writing to said processing element main memory;

a locality manager memory for storing local locality manager code and data;

a locality manager processor for controlling data movement between processing elements which are cooperating on a single task by executing local locality manager code which indicates when shared data can be released and when non-local data is requested;

main memory updating means for updating data stored in said processing element main memory in accordance with data in said data portion of the cache memory; and routing logic means having direct access to said locality manager memory and said processing element main memory and connected to said locality manager processor for routing data as specified in said local locality manager code.

14. The parallel multiprocessor claimed in claim 13, further comprising a CPU bus and a bus interface logic unit connected to said central processing unit and said CPU bus for detecting cpu events by monitoring tag bits coupled to said local locality manager code and passing memory accesses to said processing element bus.

15. The parallel multiprocessor claimed in claim 14, further comprising a cpu-lm fifo connected to said bus interface logic unit, said bus interface logic unit placing address bits and tag bits into said cpu-lm fifo whenever said bus interface logic unit detects a cpu event.

16. The parallel multiprocessor claimed in claim 15, further comprising a block logic unit connected to said bus interface logic for storing synchronization bits for data stored in said processing element main memory, the synchronization bits indicating whether data may be written over or read, said bus interface logic unit checking said block logic unit whenever a reference is taggable.

17. The parallel multiprocessor claimed in claim 14, further comprising block logic means connected to said bus interface logic unit for controlling synchronization of taggable data that has been requested or released.

18. The parallel multiprocessor claimed in claim 17, wherein said block logic means for controlling comprises means for preventing a reading of a taggable variable that has been requested until after data associated with the taggable variable has been received.

19. The parallel multiprocessor claimed in claim 17, wherein said block logic means for controlling comprises means for preventing over-writing of taggable variables that have been released until after data associated with the taggable variable has been sent a predetermined number of times.

20. The parallel multiprocessor claimed in claim 17, wherein said block logic means for controlling comprises means for preventing reading from and preventing writing to taggable variables after the data associated with the taggable variable has been requested and released, respectively.

21. A method for making a parallel multiprocessor which can execute code resulting from a program which has been compiled, said code including locality manager code and cpu code, comprising the steps of:

arranging a first processor to serve as a central processing unit for executing local cpu code;

coupling a second processor to the first processor to serve as a locality manager unit for executing local locality manager code;

coupling a routing logic unit to the second processor, whereby the first processor, the second processor and the routing logic unit comprise a processing element;

repeating said arranging and both of said coupling steps yielding a plurality of processing elements; and interconnecting the plurality of processing elements by interconnecting the plurality of routing logic units, wherein the second processors control movement of data between processing elements independently of the first processors and the first and second processors are separately programmable.

* * * * *